United States Patent [19]

Yanase et al.

[11] Patent Number: 4,849,621
[45] Date of Patent: Jul. 18, 1989

[54] ROTATIONAL-POSITION DETECTING APPARATUS WITH TWO SHAPED PHOTOVOLTAIC SURFACES

[75] Inventors: Takao Yanase; Koetsu Fujita, both of Kawasaki, Japan

[73] Assignee: Fuji Electric Co., Ltd., Kawasaki, Japan

[21] Appl. No.: 170,135

[22] Filed: Mar. 14, 1988

Related U.S. Application Data

[63] Continuation of Ser. No. 919,205, Oct. 14, 1986, abandoned.

[30] Foreign Application Priority Data

Oct. 16, 1986 [JP] Japan ................................. 61-228852

[51] Int. Cl.$^4$ .......................... H01J 40/14; G01D 5/34
[52] U.S. Cl. ........................... 250/211 K; 250/231 SE
[58] Field of Search ........ 250/211 K, 237 G, 231 SE, 250/211 J; 340/347 P; 33/125 A, 125 L; 341/13

[56] References Cited

U.S. PATENT DOCUMENTS 4,238,781 12/1980 Vercellotti et al. ............. 340/347 P
4,314,153 2/1982 Humphries et al. .......... 250/231 SE
4,587,485 5/1986 Papiernik ...................... 250/231 SE
4,637,810 6/1987 Babsch et al. ................ 250/231 SE
4,737,635 4/1988 Uchida ......................... 250/231 SE Primary Examiner—David C. Nelms
Assistant Examiner—Michael Messinger
Attorney, Agent, or Firm—Bruce L. Birchard

[57] ABSTRACT

A non-contact, non-electromagnetic, compact, light-weight rotating body rotational-position detecting apparatus in which a disk or ring-shaped light source is spaced from a light receiving plate having thereon a region of photovoltaic material, by a shield plate which is coupled to the rotating body. The shield plate has a light-passing aperture therein so that the area of the photovoltaic material which is exposed to the light source varies with the angular position of the rotating body. The light source, photovoltaic regions, light shield and the shaft carrying the light shield and coupled to the rotating body are coaxial, the voltage produced across the load coupled to each of the photovoltaic regions being a function of the angle of rotation of the rotating body, thus indicating the angular position of the rotating body at any moment.

7 Claims, 2 Drawing Sheets

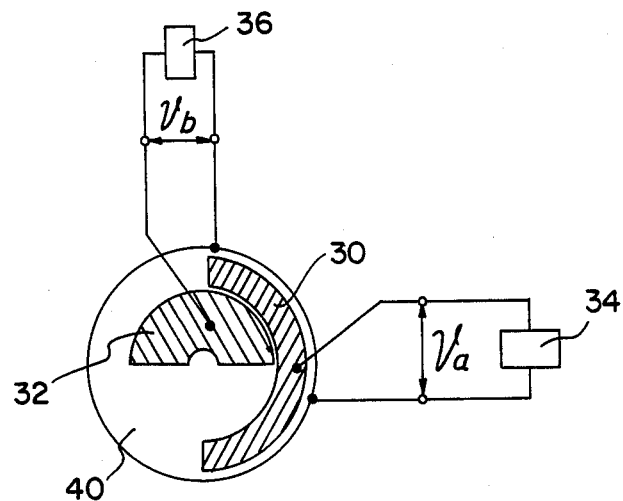
FIG. 2
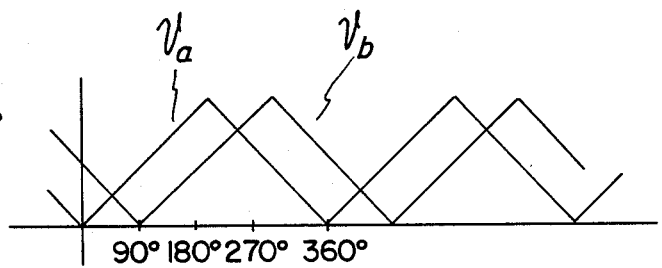
FIG. 2A
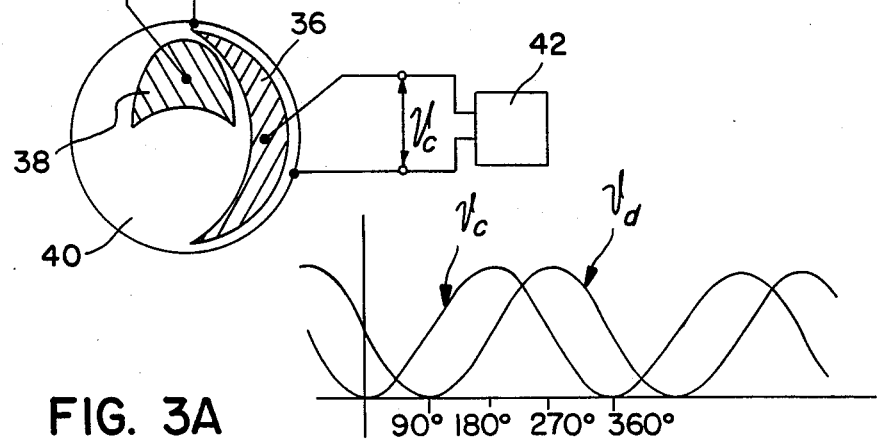
FIG. 3
FIG. 3A

ROTATIONAL-POSITION DETECTING APPARATUS WITH TWO SHAPED PHOTOVOLTAIC SURFACES

This application is a continuation of application Ser. No. 06/919,205, filed Oct. 14, 1986 now abandoned.

BACKGROUND OF THE INVENTION

1. Field of the Invention

This invention relates to equipment for determining the rotational position of a shaft carrying a rotating body and more specifically to rotational-position detecting apparatus which utilizes a noncontact method for determining rotational position.

2. Prior Art

Synchronous resolvers utilizing electromagnetic coupling principles are well known as devices for determining the position of a rotating body. In such devices the coefficient of electromagnetic coupling between a rotor and a stator is a sine or cosine function of the rotational position of the rotating body, as viewed from a reference axis on the stator of the resolver. In such devices the winding of the stator is excited by sine-wave voltage and the output voltage from the rotor is a cosine function of the input sinewave voltage. The problem with such electromagnetic resolvers is that windings are required for both the stator and the rotor and the degree to which the size of the resolver can be reduced is limited by the need for such windings.

Further, an exciting voltage and a demodulation circuit are necessary in order to derive the desired output indicator signal. Such a circuit can be relatively complex. With complexity comes higher cost and greater size.

Therefore, it is a general object of the present invention to provide low-cost, compact, lightweight and inexpensive means for determining the rotational-position of a rotating body.

It is a further object of the present invention to provide, for determining the rotational-position of a rotating body, apparatus which is free of the problems associated with electromagnetic resolvers.

SUMMARY OF THE INVENTION

The rotational-position detecting apparatus according to the present invention comprises a fixed light source of a ring or disk shape for emitting parallel light rays, a shield plate rotatable in unison with the rotating body, the rotational-position of which is to be determined, the shield plate having a light-passing aperture, and a fixed light-receiving plate having a portion thereof coated with a photovoltaic material for generating an electrical output signal proportional to the area of the photovoltaic material being illuminated by the light from the disk or ring light source, the light source, apertured shield plate and fixed light receiving plate being positioned along a common axis but spaced with respect to each other.

The light-passing aperture in the shield plate extends only through a range corresponding to an angle of rotation of 180 degrees about the central axis, as a result of which the output obtained from a photovoltaic coating on the fixed plate is obtained as a predetermined function of the angle of rotation of the shield plate and the shape of the photovoltaic coating on the fixed light-receiving plate. In all embodiments of this invention one 360-degree rotation of the apertured shield plate produces only one cycle of each output signal from any one photovoltaic coating on the fixed plate.

BRIEF DESCRIPTION OF THE DRAWINGS

This invention can best be understood by reviewing the description which follows in conjunction with the drawings herein, in which:

FIG. 2 is a schematic mechanical diagram of an alternative embodiment of the apparatus of FIG. 1;

FIG. 2A is a graphical representation of the output voltages obtained from the apparatus of FIG. 2;

FIG. 3 is a schematic mechanical diagram of a further embodiment of the apparatus of FIG. 1; and, FIG. 3A is a graphical representation of the relationship between voltage and rotational-position in the apparatus of FIG. 3.

DETAILED DESCRIPTION OF THE PREFERRED EMBODIMENTS

Figure 1:
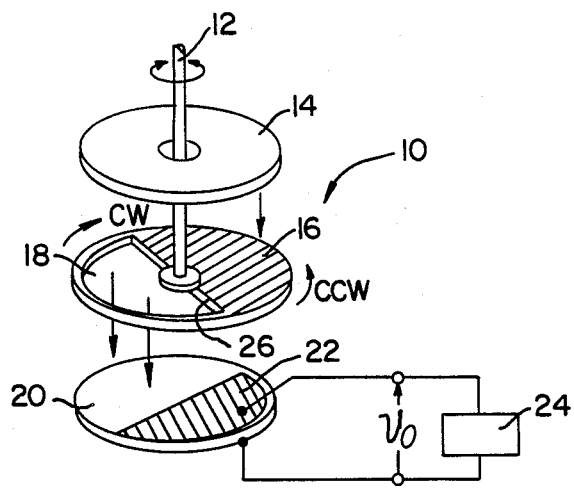
FIG. 1 is a mechanical schematic diagram of one embodiment of this invention.

In FIG. 1 rotational-position detecting apparatus 10 includes shaft 12 which is coupled to the rotating body, the rotational-position of which is being measured. A ring or disk light source 14, which may be a light emitting diode (LED), is positioned coaxially with respect to shaft 12 but need not be coupled to it. Shield plate 16 is mounted on shaft 12 to move in concert therewith. Shield plate 16 includes a light-passing aperture 18 which is in the shape a sector of a circle of an extent approximating 180 degrees. Light receiving plate 20 is positioned coaxially with shield plate 16 and is spaced therefrom to permit free motion of shield plate 16 in concert with shaft 12. Light receiving plate 20 has a semi-circular-shaped photovoltaic coating 22 on its upper surface. Although the spacings between light emitter 14, shield plate 16 and light receiving plate 20 are shown as rather large in FIG. 1, it should be understood that the spacing needs only to be sufficient to permit free motion of shield plate 16 with respect to light source or emitter 14 and light receiving plate 20. The photovoltaic material 22 may be amorphous silicon, which generates across a load 24, having a resistive component, a voltage Vo proportional to the intensity of the light falling on coating 22 and the area of coating 22 which is exposed to that light.

As the rotating body, the position of which is being determined, rotates, thus rotating shield plate 16, the portion of coating 22 which is exposed to the light from source or emitter 14 varies. The progressive change of this exposed portion of coating 22 as shield plate 16 rotates is illustrated in FIG. 1A.

Figure 1A:
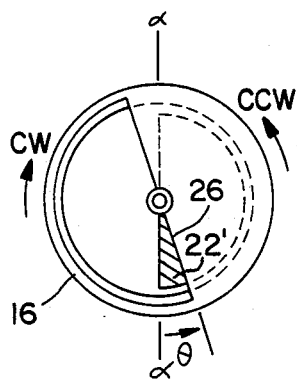
FIG. 1A is a mechanical schematic diagram showing a first adjustment of the apparatus of FIG. 1.
Figure 1B:
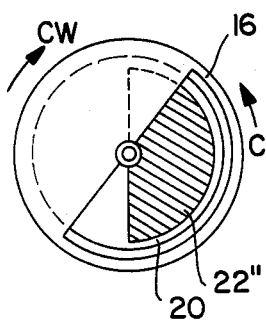
FIG. 1B is a mechanical schematic diagram showing a second adjustment of the apparatus of FIG. 1.
Figure 1C:
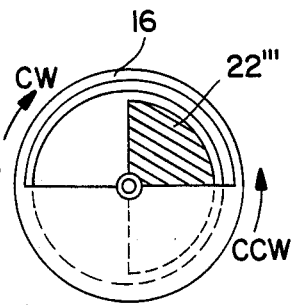
FIG. 1C is a mechanical schematic diagram showing a third adjustment of the apparatus of FIG. 1.

As shown in FIG. 1A, assuming that $\alpha$ is a reference angle for the fixed light emitter 14 and $\theta$ is the angle at which the edge 26 of shield plate 16 is displaced angularly, from reference angle $\alpha$, $\theta$ varies progressively as shown in FIGS. 1A, 1B and 1C in response to the rotation of shield plate 16. In other words, assuming that shield plate 16 is rotating in a counterclockwise direction from a position where θ equals 0, the exposed area of the photovoltaic coating 22 varies progressively as indicated at 22', 22" and 22'". Thus the exposed area of photovoltaic coating 22 varies progressively and in proportion to θ. That area, which can be referred to as S, is a maximum when θ=180 degrees and decreases in proportion to θ when θ is greater than 180 degrees. The exposed area (S) is 0 when θ=360 degrees.

Figure 1D:
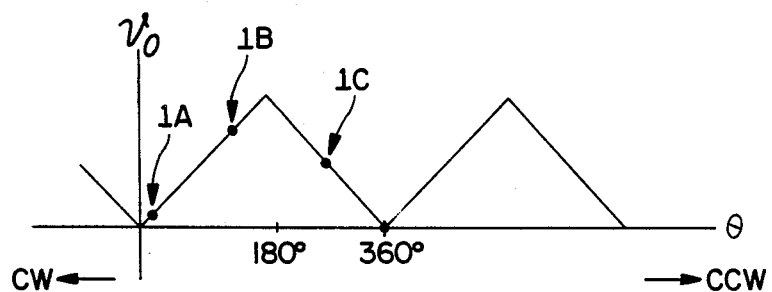
FIG. 1D is a graphical representation of the relationship between rotation and voltage output from the apparatus of FIG. 1.

The progressive change of the area S (which corresponds to the exposed area of coated surface 22) with respect to θ is illustrated graphically in FIG. 1D from which it may be observed that a triangular wave form appears when the output voltage Vo (across a load) is plotted vs. θ, the angle of rotation of light shield 16 with respect to the reference angle α. Thus by measuring the output voltage Vo across a load 24 the position of the rotating body coupled to shaft 12 may be determined accurately.

Using a semi-circular shape for the photovoltaic coating 22 makes it possible to represent the position of the rotating body, not shown, as a trigonometric function of its angle of rotation. By analogy, if the photovoltaic coating or coatings have a different shape or number it is possible to determine the position of the rotating body by a different mathematical function.

In FIG. 2 the variation in shaping of the photovoltaic coating is considered and analyzed.

In FIG. 2 there are two photovoltaic coatings 30 and 32 on light receiving plate 40, shaped to have an angular extent, each, of 180 degrees but displaced angularly from each other by an angle of 90 degrees. This configuration is referred to hereinafter as "90-degree space-phase." The photovoltaic coatings 30 and 32 are coupled to their respective loads 34 and 36 so as to produce, with illumination thereof, voltages Va and Vb, respectively, across their loads. By utilizing those voltages Va and Vb it is possible to obtain a two-phase output in which the voltages Va and Vb are displaced in phase by 90 degrees. This condition is referred to hereinafter as 90-degree time-phase." FIG. 2A shows this two-phase output voltage from the structure shown diagrammatically in FIG. 2.

In FIG. 3 the photovoltaic coatings 36 and 38 have been given a different shaping and different positioning on light receiving plate 40, as compared with the positioning and shaping of the photovoltaic regions in FIG. 2. It is to be noted, however, that they have in FIG. 3, the same 90 degree phase displacement as was established in the structure of FIG. 2. However, as can be seen more clearly in FIG. 3A, the voltages Vc and Vd across their respective loads 42, 44 are sinusoidal in shape. Again it is to be noted that they are displaced 90 degrees in phase so that we again have a two-phase output. If only a single photovoltaic coating 36 is shaped and positioned on light-receiving plate 40, it is possible to obtain an output voltage that is a sine function of θ, the angle of displacement from the reference angle α shown in FIG. 1A.

It is to be noted that it is possible to obtain various functions of shaft rotation as well as various phases in the output voltages of the photovoltaic regions on light receiving plate 40 by changing the positioning and shaping of the light converting or photovoltaic regions such as 36 and 38 in FIG. 3.

While particular embodiments of this invention have been shown and described it is apparent to those ordinarily skilled in the art that alterations or modifications may be made therein without departing from the true scope of this invention. It is the purpose of the appended claims to cover all such modifications and alterations.

What is claimed is:

1. Rotating-body rotation-position detecting apparatus including:
   a shaft for coupling to a rotatable body the angular position of which is to measured;
   a distributed light-generator fixedly positioned with its center aligned with said shaft;
   a first shaped photovoltaic surface aligned with said distributed light generator;
   a shield plate interposed between but spaced from said distributed light generator and said first shaped photovoltaic surface;
   said shield plate being coupled to said shaft for rotation in unison therewith;
   said shield plate having a light-passing aperture therethrough of angular extent approximating the angular extent of said first shaped photovoltaic surface and positioned to align itself with said first shaped photovoltaic surface during rotation of said shield plate;
   means for deriving from said first photovoltaic surface, during a single 360-degree rotation of said shield plate, a single cycle of a first electrical signal;
   a second shaped photovoltaic surface aligned with said light source and positioned in 90-degree space-phase with respect to said first shaped photovoltaic surface; and,
   means for deriving from said second photovoltaic surface, during said single 360-degree rotation of said shield plate, a single cycle of a second electrical signal having a 90-degree time-phase relationship with respect to said first electrical signal.

2. Apparatus according to claim 1 in which said shaped photovoltaic surfaces are each so shaped as to produce a sinusoidal output electrical signal upon rotation of said shield plate.

3. Apparatus according to claim 1 in which said photovoltaic surfaces are shaped to produce respective saw-tooth-shaped output electrical signals upon rotation of said shield plate.

4. Apparatus according to claim 3 in which said distributed light-generator is a disc-shaped LED.

5. Apparatus according to claim 3 in which said distributed light-generator is a ring-shaped LED.

6. Apparatus according to claim 2 in which said distributed light-generator is a ring-shaped LED.

7. Apparatus according to claim 2 in which said distributed light-generator is a disc-shaped LED.

* * * * *